Feb. 13, 1923.
L. BOIRAULT.
BRAKE OPERATING MECHANISM.
FILED APR. 12, 1920.
1,445,065.
2 SHEETS—SHEET 1.
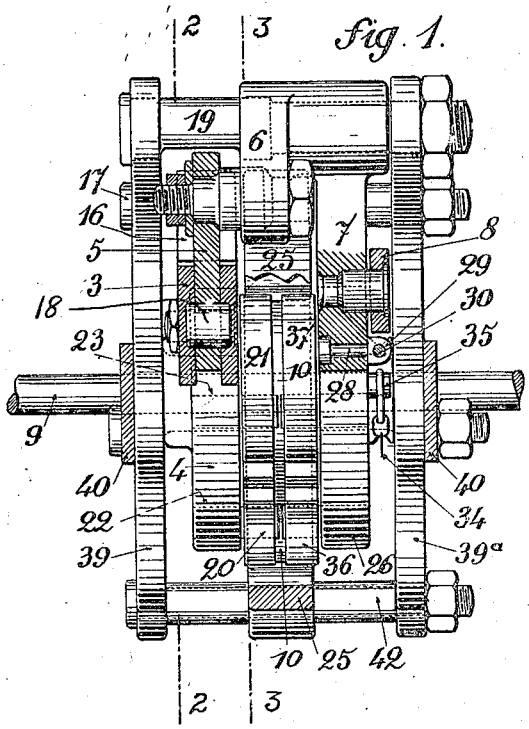
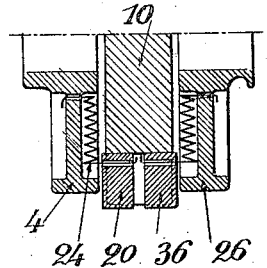
Inventor
Louis Boirault
By H. B. Willson & Co
Attorneys

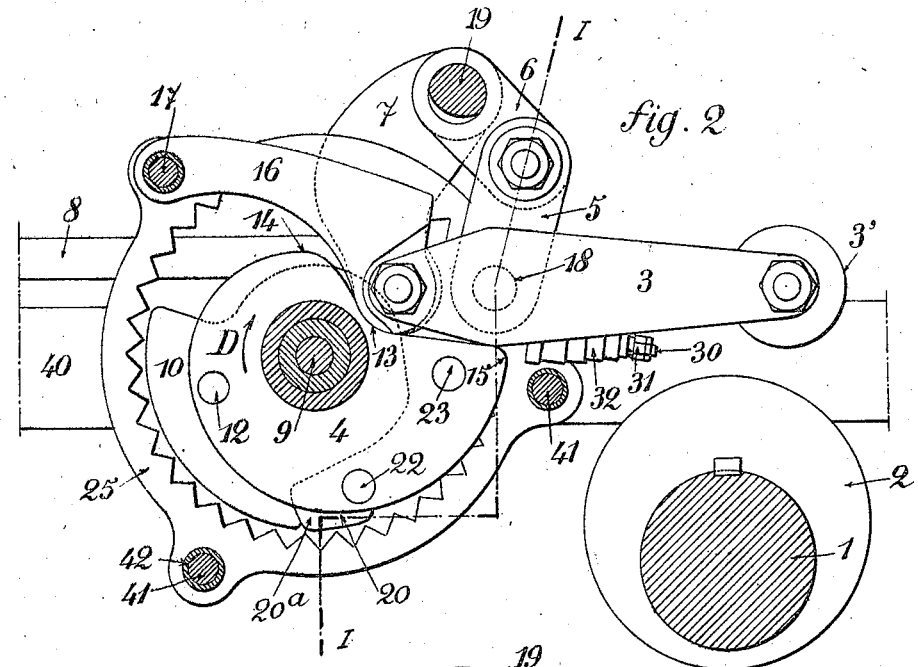
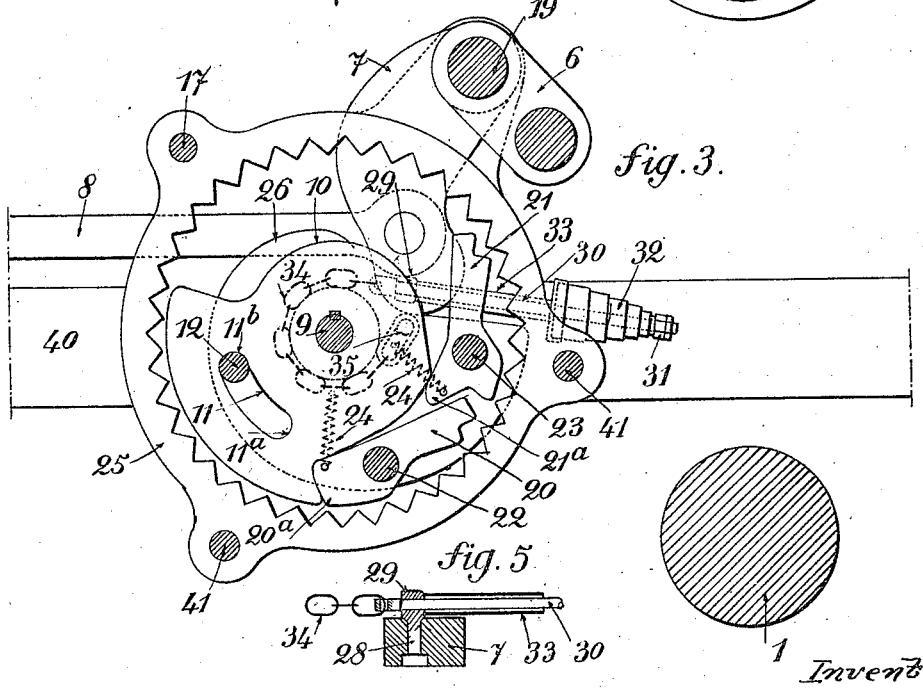

Patented Feb. 13, 1923.

1,445,065

UNITED STATES PATENT OFFICE.

LOUIS BOIRAULT, OF PARIS, FRANCE.

BRAKE-OPERATING MECHANISM.

Application filed April 12, 1920. Serial No. 373,364.

*To all whom it may concern:*

Be it known that I, LOUIS BOIRAULT, a citizen of the Republic of France, residing at Paris, Seine Department, 58 rue Taitbout, in the Republic of France, have invented certain new and useful Brake-Operating Mechanism (for which I have filed an application in France, June 15, 1914), of which the following is a specification.

The present invention has for its object improvements in operating mechanism for brakes and more particularly those used on railway vehicles of the kind in which the operating lever of the brake rigging is actuated by an eccentric fixed on one of the axles, when one end of this lever is brought into the path traversed by this eccentric, under the action of a cam which is actuated either by hand, or by some suitable mechanical means which lifts the opposite end of the said lever. In such a system, the reactions exerted by the lever on the cam by reason of the resistance of the spring or springs interposed between the rigging have a tendency to bring this cam back to the rear, so that the expedient has already been resorted to of combining with this cam a ratchet or wedge catch which avoids its untimely recoil. In the apparatus of this kind hitherto constructed however, the security afforded by the catch was insufficient and it is possible that there might be produced under certain circumstances, particularly under the influence of vibration and variations of the co-efficient of friction between the parts in contact, an abrupt return of the cam to the rear and, consequently, breakage of the parts.

The improvements which form the subject matter of this invention have for their object to avoid these disadvantages and to ensure the most complete security. They also permit of the reduction of the force to be exerted in order to actuate the cam so that a man can easily and rapidly operate the brake on the largest and most heavily loaded wagons.

A constructional example of a brake according to the present invention is shown in the accompanying drawing by way of example.

Figure 1 is a vertical section of the apparatus on the line 1—1 of Figure 2.

Figures 2 and 3 are vertical sections on the lines 2—2 and 3—3 of Figure 1.

Figure 4 is a partial vertical section along the axis of rotation of the operating cam.

Figure 5 is a partial longitudinal section of a compensating elastic driving member.

1 denotes an axle of the wagon, and 2 the eccentric fixed on this axle and serving to actuate the lever 3, provided with a roller 3', when this lever has been put in place by means of the cam 4. The lever 3 is connected by a connecting rod 5 to an elbow lever 6, 7 to which is pivoted the rod 8 which operates the brake rigging (not shown). On the other end, said lever 3 is pivoted to an arm 16 oscillating about a fixed shaft 17. The cam 4 is mounted loosely on the hub of a fixed plate 39, through the centre of which passes loosely a shaft 9 which can be caused to rotate at will by means of any kind of mechanical gearing (not shown).

Upon this shaft 9 is keyed an operating plate 10, called a flywheel, in which is cut a curved slot 11 in which works freely a pin 12 attached to the cam 4.

The cam 4 is of special shape, its periphery having a sharp depression 13 and a gradually increasing radius or inclination from 14 to 15 (the inclination at each point of the profile being measured by the angle which the normal to the profile at this point makes with the radius passing through this point and the axis of rotation of the cam).

In the position of rest of the apparatus which is shown in the drawing, the brake being "off", the movable end of the arm 16 bears upon the low point of the cam 4 and the roller 3' placed at the free end of the lever 3 is situated outside the path traversed by the eccentric 2.

If the shaft 9 be rotated in the direction of the arrow D, the flywheel 10 drives the cam 4 round as soon as the end $11^a$ of the slot 11 comes into contact with the pin 12. Due to the shape of the cam from 13 to 14 and 14 to 15, it will cause the arm 16 to rise and the lever 3 to rock about its pivot 18 with the connecting rod 5 so that its free end provided with the roller 3' passes into the path of the eccentric. In consequence of the rotation of this latter, the lever 3 becomes pushed back upwards about its end which is pivoted to the arm 16 and thus lifts the connecting rod 5 so that the elbow lever 6, 7 oscillates about its shaft 19 and pulls on the rod 8 and produces the desired application of the brakes by the aid of one or more springs interposed in the rigging. This application of the brakes is the more energetic the more the cam 4 is rotated in a forward direction and the more the portion 14 to 15 lifts the arm 16 upward.

In order to prevent the reaction of the brakes which create a powerful pressure of the arm 16 on the cam 4, from producing the recoil of this latter in the reverse direction of the arrow D, notwithstanding the slight inclination of the portion 14 to 15, the present apparatus has a catch arrangement of the ratchet type.

This arrangement has two pawls 20 and 21 pivoted on the cam 4 at 22 and 23, and subjected to the action of springs 24 which tend to press them against the teeth of a fixed ring 25, toothed internally and arranged around the space occupied by the flywheel 10. The noses of the pawls are set such a distance apart that when one of the noses is opposite a projection on the ring 25, the other is opposite a hollow therein. The cam can thus be arrested in positions which differ from each other by only half the pitch of the series of teeth. In consequence of the large diameter of the ring, the angular distance apart corresponding to these successive positions may be relatively small.

In the position of rest shown, the pawls are held away from the ring by the pressure of suitable parts of the flywheel on the tails 20$^a$ and 21$^a$ of the pawls. As soon as the flywheel is moved in the direction of the arrow D relatively to the cam, the pawls are left to the action of the springs 24 and bear against the ring, so that they oppose themselves to the recoil of the cam as long as the flywheel is not brought back to the rear.

A cam 26 the profile of which may be similar to that of the cam 4 is mounted, like this latter, on the hub of a second fixed plate 39$^a$, through which the shaft 9 likewise passes. This cam, which is intended to hold the brakes "on" after they have been applied, is arranged opposite the elbow lever 6, 7; the profile of which is determined in such a way that the profile of the cam 26 travels over it in proportion as the lever 6, 7 oscillates under the combined action of the cam 4 and the eccentric 2. A compensating elastic driving member fixed to the lever 7 communicates the movement of this lever to the cam 26. This member comprises a shaft 28 mounted on the arm 7 so as to be capable of rotating and provided with an eye 29, a rod 30 passing freely through this eye, a nut 31 screwed on to one end of this rod, a spring 32 and a socket 33 placed around the rod and interposed between the nut 31 and the eye 29, and a chain 34 attached at one end to the rod 30 and at the other end to a pin 35 attached to the cam 26, this chain passing around the hub of this latter. The diameter of this hub is such that the driving of the cam 26 by the chain 34 leaves the profile of this cam slightly and progressively behind the profile of the lever 7 during the movement which puts the brakes on. This retardation is compensated by the progressive expansion of the spring 32. It results from this arrangement that on the reverse movement (the taking off of the brakes) the spring 32 is compressed progressively and offers a resistance to the untimely return backwards of the cam 26 under the effect of the reversibility which is always to be feared in consequence of shocks.

The keeping on of the brakes is completed by a set of pawls 36 and 37, similar to the pawls 20, 21 of the cam 4. These pawls, which are mounted on the cam 26, bear likewise against the toothed ring 25.

To take the brakes off, it suffices to rotate the shaft 9 in the reverse direction to the arrow D. The first rotary movement of the flywheel 10 has the effect of causing the pawls 20, 21, 36, 37 to oscillate so as to disengage them from the ring 25. Then the flywheel drives round the cam 4 by the aid of the pin 12 or the tail 20$^a$ of the pawl 20, and the cam 26 by the aid of the tail of the pawl 36.

In the constructional form shown, the shaft 9, the spindle 19 on which the lever 6, 7 oscillates, and the spindle 17 of the arm 16 are carried by the two plates 39, 39$^a$. These latter are fixed to cross bars 40 forming a support which is itself fixed to the frame of the vehicle. These plates are connected together by the spindle 17 and by two bolts 41, which likewise pass through the ring 25, this latter being held in place by tubes 42 which form cross ties.

The whole of the apparatus will be preferably enclosed in a casing containing some lubricating material, the use thereof being rendered possible by the slight inclination of the portion 14 to 15 and by the catches, and having the advantage of ensuring the constancy of the co-efficient of friction between the cam and the parts against which they act. It is to be understood that by reason of the slight inclination of the cam surfaces with regard to the radii, it is possible to obtain a perfect effect of wedging, even if the sliding coefficient between these surfaces is feeble, i. e., if they are lubricated. It is obvious that the friction coefficient of constantly lubricated surfaces will remain always invariable, especially if the cams are enclosed in a casing filled with oil, while with cams working in the atmosphere and not lubricated, the rust cinder, snow, ice, etc., will to a great deal modify the friction coefficient. It is therefore advantageous from the standpoint of the security of the working to lubricate the cams and to preserve them from the prejudicial action coming from the outside.

Claims:

1. An operating device for brakes comprising the combination of an eccentric fixed on an axle, a brake rigging rod, a lever connected operatively to this rod, a rotatable cam adapted to operate the said lever in order to bring it into the path traversed by the said eccentric, retaining pawls mounted on the said cam and a fixed toothed ring with which the said pawls co-operate in order to prevent the rotation of the said cam under the influence of the reaction of the said lever.

2. An operating device for brakes comprising the combination of an eccentric fixed on an axle, a brake rigging rod, a lever connected operatively to this rod, a rotatable cam adapted to operate the said lever in order to bring it into the path traversed by the said eccentric, a rotatable operating plate connected to the said cam by a lost motion connection, retaining pawls mounted on the said cam and a fixed toothed ring with which the said pawls cooperate in order to prevent the rotation of the said cam under the influence of the reaction of the said lever, the said plate having projections adapted to engage the pawls and move them away from the said toothed ring when it is rotated relatively to the cam in the direction corresponding to the taking off of the brakes.

3. An operating device for brakes comprising the combination of an eccentric fixed on an axle, a brake rigging rod, an elbow lever having one arm connected to said rod, a second lever pivoted to the other arm of the said elbow lever, a rotatable cam adapted to operate the second lever in order to bring it into the path traversed by the said eccentric, a second cam adapted to be actuated by the first mentioned cam, and an elastic connection between the said elbow lever and this second cam, the periphery of this latter cam being adapted to engage the said elbow lever and serving to prevent any undesirable loosening of the brakes.

4. An operating device for brakes comprising the combination of an eccentric fixed on an axle, a brake rigging rod, an elbow lever having one arm connected to the said rod, a second lever pivotally associated with the other arm of the said elbow lever, a rotatable cam adapted to operate the second lever in order to bring it into the path traversed by the said eccentric, a second cam adapted to be actuated by the first mentioned cam, and an elastic connection between the said elbow lever and this second cam, the periphery of this latter cam being adapted to engage the said elbow lever and serving to prevent any undesirable loosening of the brakes, a fixed toothed ring and retaining pawls mounted on said cams and adapted to cooperate with the said toothed ring.

In testimony, that I claim the foregoing as my invention I have signed my name in presence of two subscribing witnesses.

LOUIS BOIRAULT.

Witnesses:
HENRY T. WILCOX,
MAURICE ROUX.